United States Patent [19]
Ueno et al.

[11] Patent Number: 5,563,957
[45] Date of Patent: Oct. 8, 1996

[54] INFORMATION RECOGNITION WITH TRANSMISSION BETWEEN CHARACTER SEGMENTING AND RECOGNITION PROCESSORS

[75] Inventors: Shugoro Ueno, Tokyo; Masami Kugai; Tetsuomi Tanaka, both of Yokohama, all of Japan

[73] Assignee: Canon Kabushiki Kaisha, Tokyo, Japan

[21] Appl. No.: 267,303

[22] Filed: Jun. 29, 1994

Related U.S. Application Data

[60] Continuation of Ser. No. 3,958, Jan. 19, 1993, abandoned, which is a division of Ser. No. 698,949, May 13, 1991, abandoned.

[30] Foreign Application Priority Data

| | | | |
|---|---|---|---|
| May 15, 1990 | [JP] | Japan | 2-125936 |
| Jul. 18, 1990 | [JP] | Japan | 2-191021 |

[51] Int. Cl.$^6$ .................................................. G06K 9/00
[52] U.S. Cl. .................................................. 382/173
[58] Field of Search .................................. 382/173, 181, 382/209, 218, 276, 282

[56] References Cited

U.S. PATENT DOCUMENTS

| | | | |
|---|---|---|---|
| 3,643,223 | 2/1972 | Ruth et al. | 364/200 |
| 4,015,243 | 3/1977 | Kurpanek et al. | 364/200 |
| 4,047,159 | 9/1977 | Boudry | 364/200 |
| 4,047,246 | 9/1977 | Kerllenevich et al. | 364/200 |
| 4,170,038 | 10/1979 | Bouvier et al. | 364/200 |
| 4,363,096 | 12/1982 | Comfort et al. | 364/200 |
| 4,512,032 | 4/1985 | Namba | 382/9 |
| 4,695,828 | 9/1987 | Yamamoto | 382/9 |
| 4,907,283 | 3/1990 | Tanaka et al. | 382/9 |
| 4,969,089 | 11/1990 | Jäkel | 364/200 |
| 5,033,098 | 7/1991 | Tanaka et al. | 382/9 |

FOREIGN PATENT DOCUMENTS 59-177684  10/1984  Japan.

OTHER PUBLICATIONS

Iwaki et al., "A Segmentation Method Based on Office Document Hierarchical Structure", Proc. of 1987 IEEE Intl. Conf. on Systems, Man, and Cybernetics, vol. 2, pp. 759–763.

*Primary Examiner*—Jose L. Couso
*Attorney, Agent, or Firm*—Fitzpatrick, Cella, Harper & Scinto

[57] ABSTRACT

An information recognition apparatus includes a first identification unit for performing first identification processing and a second identification unit for performing second identification processing, as units for identifying information. In this apparatus, the first identification unit and the second identification unit can perform identification processing in parallel. An information recognition method includes performing first identification processing and second identification processing as processing for identifying information. In this method, the first identification processing and the second identification processing can be performed in parallel.

18 Claims, 15 Drawing Sheets

FIG. 7

HEADER | Lx-1 | Lx-2 | Lx-3 | Lx-4 | Lx-5 | ... | Lx-n

FIG. 8

HEADER | K-1 | K-2 | K-3 | K-4 | ... | K-1 | K-2 | K-3 | K-4

1ST CHARACTER, 2ND CHARACTER, 3RD CHARACTER, ... n-TH CHARACTER

FIG. 9

HEADER | K-1 | K-2 | K-3 | K-4 | S-1 | S-2 | S-3 | S-4 | ... | K-1 | K-2 | K-3 | K-4 | S-1 | S-2 | S-3 | S-4

1ST CHARACTER, ... n-TH CHARACTER

FIG. 17
| PATTERN | DIRECTIONAL INDEX |
|---|---|
|  | 1 |
|  | 2 |
|  | 3 |
| 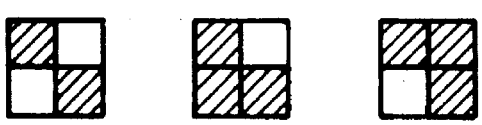 | 4 |

INFORMATION RECOGNITION WITH TRANSMISSION BETWEEN CHARACTER SEGMENTING AND RECOGNITION PROCESSORS

This application is a continuation of application Ser. No. 08/003,958 filed Jan. 19, 1993, now abandoned, which was a division of application Ser. No. 07/698,949 filed May 13, 1991, now abandoned.

BACKGROUND OF THE INVENTION

1. Field of the Invention

This invention relates to a recognition apparatus and method for recognizing input information.

2. Description of the Prior Art

There are techniques wherein a host computer is connected to a recognition apparatus via a transmission channel, the host computer performs input of image information and display/editing of the results of recognition, and the recognition apparatus performs segmenting of character and symbol images from the image information, and recognition of segmented characters and symbols.

The above-described conventional techniques, however, have the following disadvantages, since image information is transmitted from the host computer, to which an image has been input, to the recognition apparatus via the transmission channel, and the recognition apparatus performs segmenting of characters/symbols from the image information.

(1) The recognition apparatus must include a memory having a large capacity in order to store image information for performing segmenting of characters/symbols.

(2) A long transmission time is needed because of the large amount of data included in the image information transmitted from the host computer to the recognition apparatus.

(3) Since segmenting of characters/symbols is performed within the recognition apparatus, a high-speed processor is needed in order to perform the segmenting processing.

In performing character recognition on a text in a language having many kinds of characters, which are to be distinguished and recognized such as the Japanese language, there are techniques wherein processing is performed in parallel using a plurality of identical processing units in order to increase the speed of the extraction of characteristics, and recognition processing.

An explanation will new be provided of such a technique with reference to FIG. 18, In FIG. 18, an input image is separately stored in storage units 1, 2 and 3 (elements 91–93). Subsequently, three characteristics extraction units 1, 2 and 3 (elements 94–96) extract characteristics data in parallel, and input the extracted data to a characteristics data storage unit 97. Subsequently, three identification units 1, 2 and 3 (elements 98–100) perform identification in parallel, and sorting is finally performed in element 101.

The above-described conventional techniques, however, have the disadvantage of relatively high cost, since the technique must include a plurality of identical processing units.

Recognition algorithms used in character recognition have included techniques emphasizing the extraction of characteristics wherein complicated processing is performed at the stage of the extraction of characteristics, and the identification function, applied to the extracted characteristics to effect actual recognition of the character, has a simple form.

The above-described conventional techniques, however, have the disadvantage that a very long recognition time is needed because of the complicated processing at the stage of the extraction of characteristics, and complicated dedicated circuitry is needed in order to execute the processing at a high speed.

Among techniques emphasizing the identification function are techniques wherein the degree of similarity is calculated neglecting higher-order terms of eigenvalues, and only main components are analyzed, to shorten the time in recognition processing.

The above-described conventional techniques, however, have the disadvantage of decreasing the rate of recognition unless a particular countermeasure, such as increasing the number of dimensions of the characteristic vector or the like, is taken, since these techniques emphasize the recognition function based on the analysis of main components.

SUMMARY OF THE INVENTION

The present invention has the effect that the time for recognition processing can be shortened by providing an information recognition apparatus comprising first identification means for performing first identification processing and second identification means for performing second identification processing as means for identifying information, wherein the first identification means and the second identification means can perform identification processing in parallel.

The present invention also has the effect that the efficiency of a transmission channel is increased and the time for information recognition can be shortened by providing an information recognition apparatus comprising a plurality of information processing means, wherein the transmission of information from first processing means to second processing means and the transmission of information from the second processing means to third processing means can be performed in parallel.

More preferably, the present invention has the effect that the transmission of information can be adapted to a situation, and the efficiency of the transmission channel is further increased by the information recognition apparatus further comprising information amount control means for controlling the information to be transmitted so as to permit transmission of an arbitrary amount of information.

The present invention has the effect that the cost of a recognition apparatus can be reduced since the recognition apparatus need not have means for segmenting information, by providing a recognition system comprising a processing apparatus for inputting of information and for performing display and editing thereof, and recognition apparatus for recognizing input information, wherein the processing apparatus comprises segmenting means for segmenting desired information from the input information, and transmission means for transmitting the segmented desired information to the recognition apparatus.

BRIEF DESCRIPTION OF THE DRAWINGS

FIG. 7 illustrates a transmission format to be used in transmission from a host machine to a recognition apparatus;

FIG. 8 illustrates a transmission format to be used in transmission from a recognition apparatus to a host machine;

FIG. 9 illustrates a transmission format to be used in transmission from a recognition apparatus to a host machine, adding the results of calculation;

FIG. 17 illustrates directional indexes used in analysis processing for performing character recognition.

DETAILED DESCRIPTION OF THE PREFERRED EMBODIMENTS

In most cases, a character recognition apparatus is used not by itself, but combined with a host computer as a whole system. The role of the host computer as an interface with a user is of great importance.

The functions necessary for a character recognition apparatus are segmenting of characters, extraction of characteristics, gross classification, detailed classification, and postprocessing. An explanation will now be provided of a method of performing segmenting of characters and postprocessing.

The use of this method has the advantage that the character recognition apparatus need not include a memory for receving image information. Furthermore, by dividing the processing between the host computer and the character recognition apparatus, the performance speed of the processing can be increased, and the capacity of a memory incorporated in the character recognition apparatus can be minimized.

Figure 1:
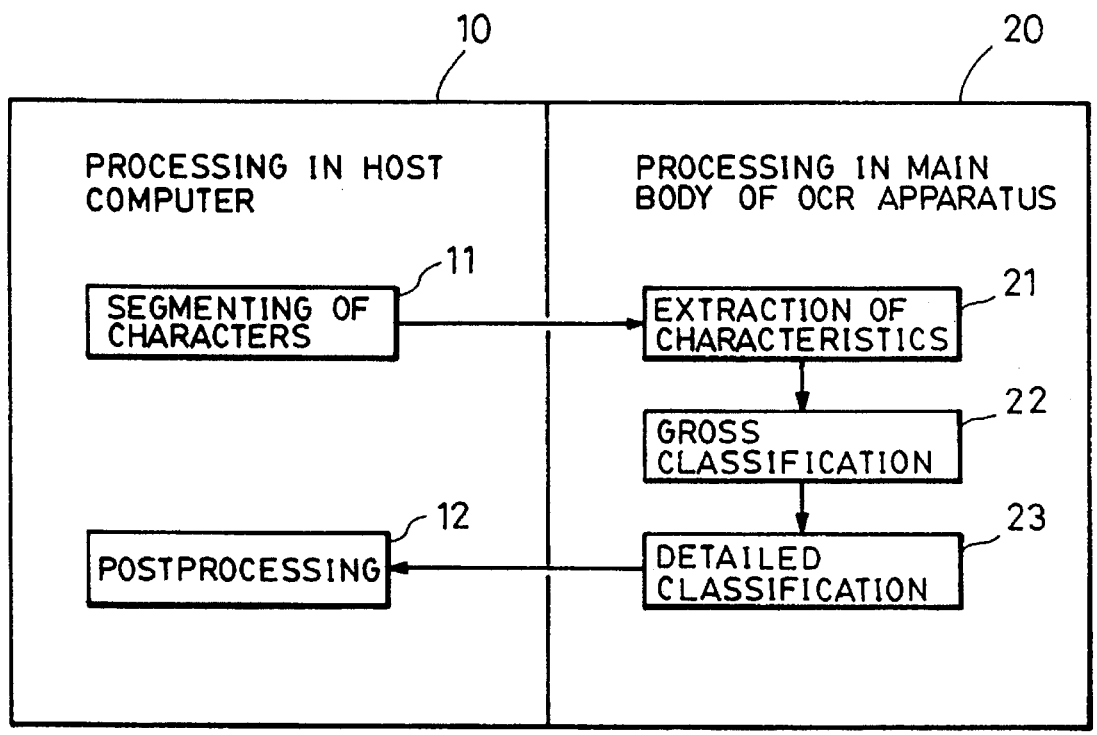
FIG. 1 is a system block diagram showing an outline of character recognition processing according to the present invention.

An explanation will now be provided of the relationship between processing in the host computer and processing in the character recognition apparatus for performing character recognition, with reference to FIG. 1.

First, image data read by a scanner are transmitted to a host computer 10. The host computer 10 segments characters (in element 11), and transmits image data for a plurality of characters to a main body 20 of an OCR apparatus. After performing extraction of characteristics in element 21, gross classification in element 22 and detailed classification in element 23, the results of recognition are sent back to the host computer 10. Postprocessing is performed in element 12 in the host computer 10. By rewriting a device driver in well-known manner, the OCR apparatus 20 can be connected to another computer.

A more detailed explanation of the processing shown in FIG. 1 will now be provided.

Figure 2:
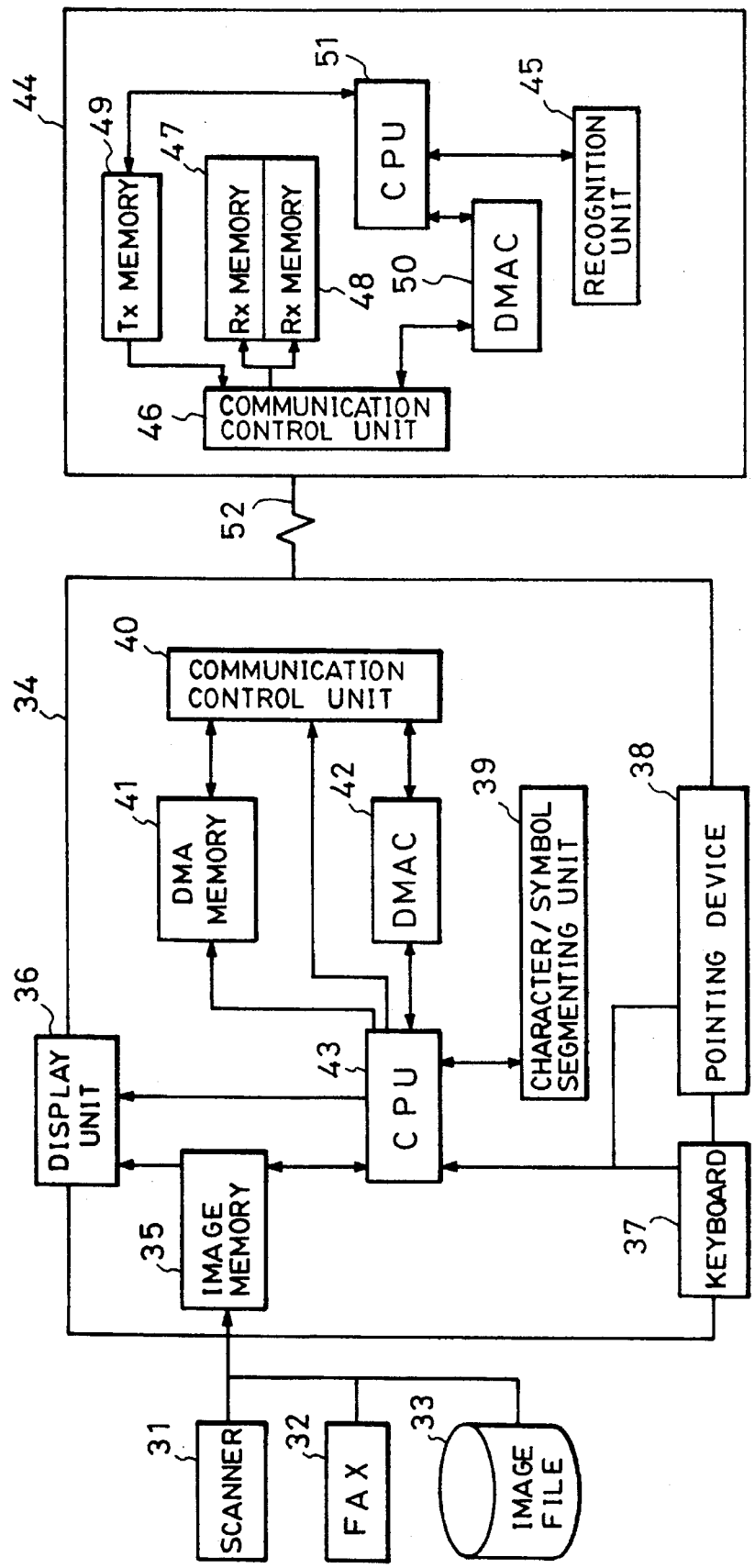
FIG. 2 shows the basic configuration of an embodiment of the present invention.

FIG. 2 is the basic configuration of the present invention. An image scanner 31, a FAX (facsimile) 32 and an image file 33 are image input apparatuses for a host machine 34. The host machine 34 comprises an image memory 35 for storing image inputs from the group of input apparatuses and outputting them to a display unit 36, a keyboard 37, serving as an input means for assigning areas in the image memory 35 and for editing/correcting the results of recognition, a pointing device 38, such as a mouse (trademark), and a character/symbol segmenting unit 39 for segmenting characters and symbols. The host machine 34 further comprises a communication control unit 40 for controlling communication with a recognition apparatus, a DMA (direct memory access) memory 41 for performing communication with the recognition apparatus by DMA transfer, a DMAC (direct memory access controller) 42 for controlling DMA, and a CPU 43 for controlling the host machine 34.

A recognition apparatus 44 comprises a recognition unit 45 for performing the extraction and identification of characteristics of characters/symbols, and a communication control unit 46 for performing communication control with the host machine 34. The recognition apparatus 44 further comprises an Rx memory 47 and an Rx memory 48 for performing DMA transfer of character/symbol image blocks from the host machine 34 and storing them, a Tx memory 49 for storing the results of recognition and performing DMA transfer of the stored results to the host machine 34, a DMAC 50 for controlling DMA transfer, and a CPU 51 for controlling the entire recognition apparatus 44.

Transmission channel 52 connects the recognition apparatus 44 to the host machine 34.

Figure 3:
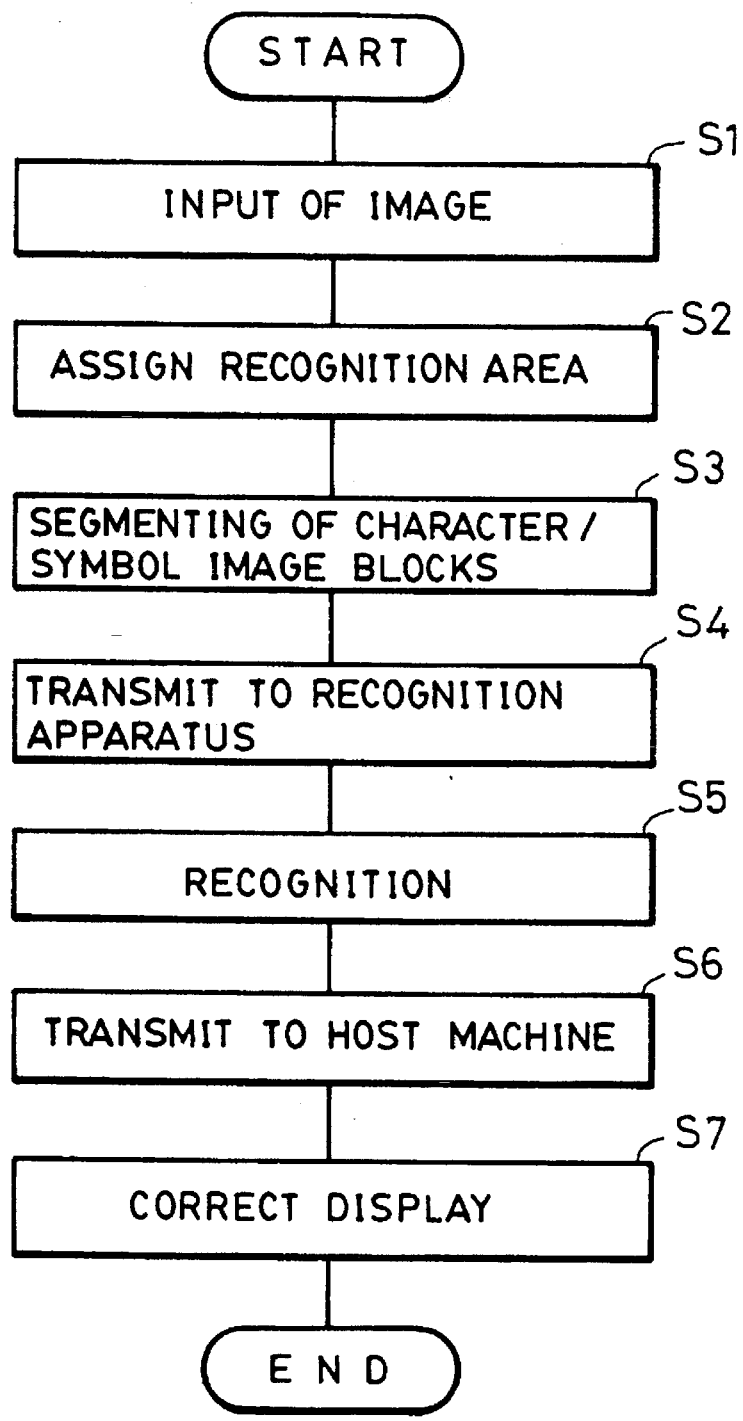
FIG. 3 is a flowchart, showing an outline of the flow of character recognition processing according to the present invention.

FIG. 3 is a flowchart showing the flow of processing according to an embodiment of the present invention performed in the CPUs 43 and 51.

Image information (an original image) is input from any of the input devices 31, 32 and 33 to the image memory 35 of the host machine 34 (S1).

The original image stored in the image memory 35 is output to the display unit 36, and the area whose contents are to be recognized is assigned using the keyboard 37 or the mouse 38 (S2).

Character/symbol image blocks in the area to be recognized assigned by the character/symbol segmenting unit 39 are segmented (S3).

The segmented character/symbol image blocks are transmitted to the recognition apparatus 44 via the communication control unit 40. At that time, the number of character/symbol image blocks to be transmitted from the host machine 34 to the recognition apparatus 44 is determined (S4).

The character/symbol image blocks transmitted to the recognition apparatus 44 are stored in the Rx memories 47 and 48, and are then transmitted to the recognition unit 45 for extraction of characteristics and the identification calculation for each of the character/symbol image blocks. As a result, candidate characters (at least one), serving as code information for characters/symbols, are obtained and are stored in the Tx memory 49 (S5).

The code information for characters/symbols, stored in the Tx memory 49, is transmitted to the host machine 34 via the communication control unit 46. At that time, the amount of the code information for characters/symbols to be transmitted from the recognition apparatus 44 to the host machine 34 (e.g., the number of such characters/symbols or any other convenient measure of the amount of information to be transmitted) is predetermined (S6).

Furthermore, the result of the identification calculation performed at step S5 is added to the information which has been stored in the Tx memory 49 and transmitted at that time.

The host machine 34 displays the code information transmitted from the recognition apparatus 44 on the display unit 36 as the results of recognition, and corrects/edits the code information in response to instructions input by the operator using the keyboard 37 or the mouse 38 (S7).

Figure 4:
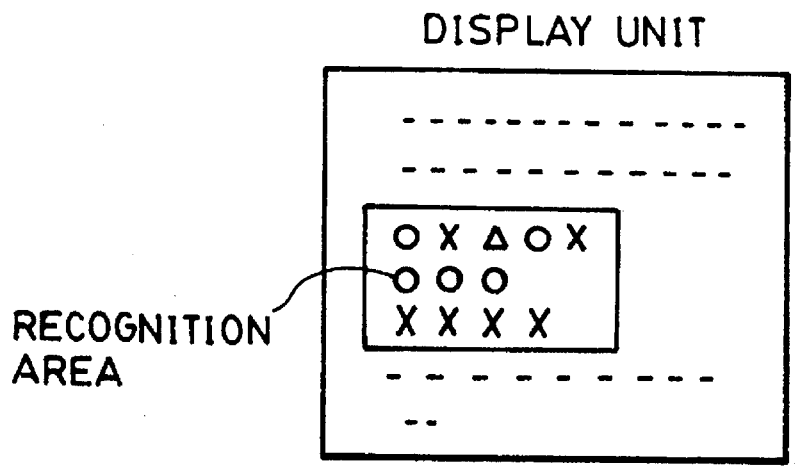
FIG. 4 illustrates a display indicating a recognition area for performing character recognition.
Figure 6:
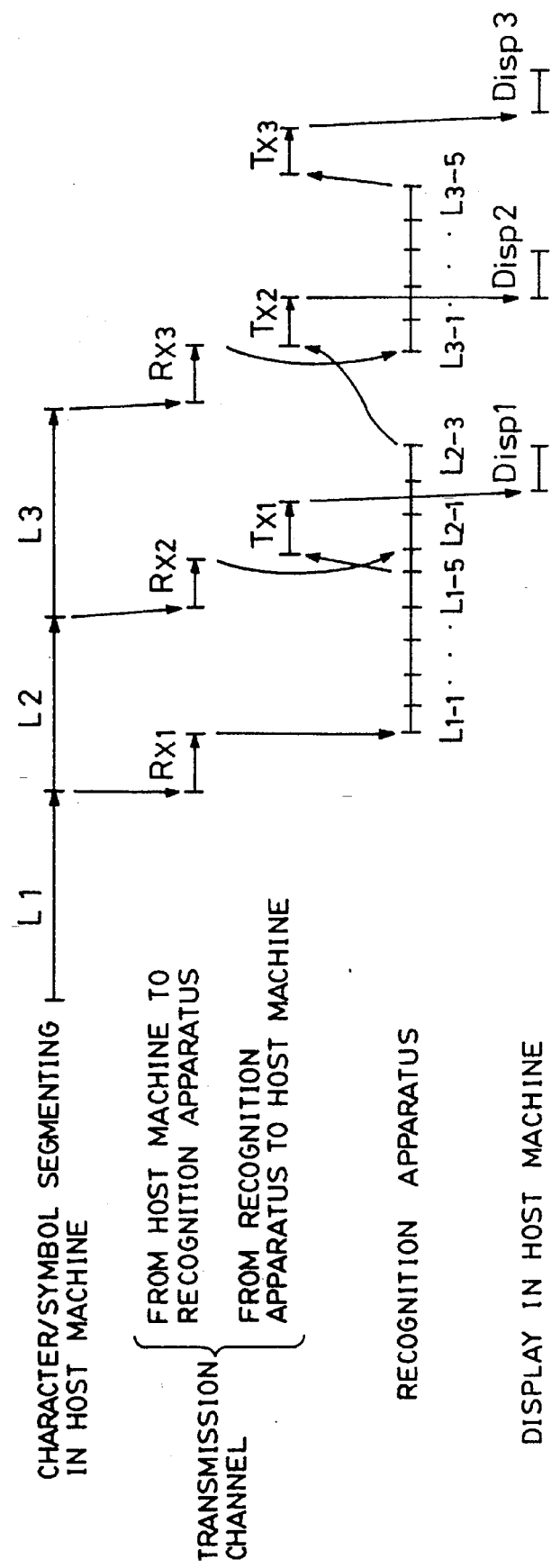
FIG. 6 illustrates the time sequence of recognition processing from segmenting of characters/symbols to display of the results of recognition.

FIG. 6 shows the time sequence of events in the recognition of characters/symbols on three lines enclosed with a frame on a display on the display unit 36 as shown in FIG. 4. A detailed explanation will now be provided of processing according to the time sequence shown in FIG. 6. In the present embodiment, a case is shown wherein segmenting of characters/symbols in the host machine 34 is performed in units of a line, and transmission is also performed in units of a line.

Figure 5:
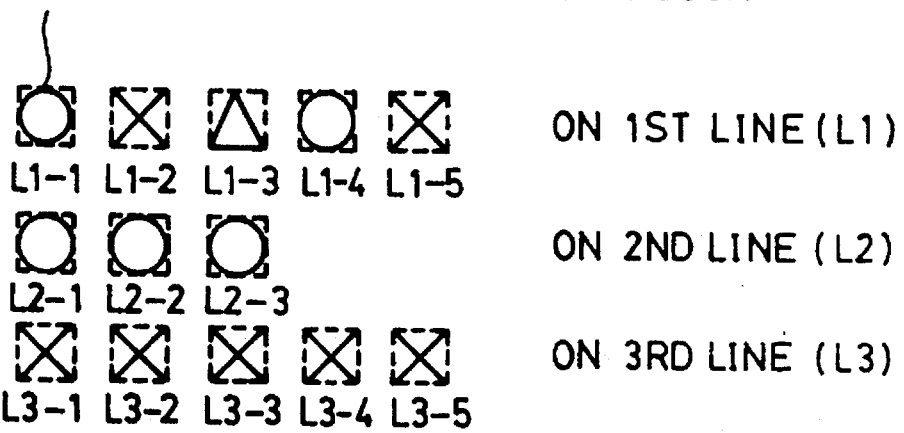
FIG. 5 illustrates characters/symbols segmented from image information.

First, image blocks in units of a character/symbol enclosed with broken lines on the first line, as shown in FIG. 5, are segmented, from the recognition area having three lines enclosed with the frame on the display shown in FIG. 4 by the character/symbol segmenting unit 39 (L1). When segmenting for one line has been completed, the contents (for 5 characters in the illustrated example) are stored in the DMA memory 41, and are transferred from the DMA memory 41 to the recognition apparatus 44 via the communication control unit 40 and the transmission channel 52 under the control of the DMAC 42 (Rx1). While the contents are transferred, the CPU 43 performs segmenting of characters/symbols on the second line using the character/symbol segmenting unit 39.

The recognition apparatus 44 stores the transferred contents (L1) in the Rx memory 47 from the communication control unit 46 by DMA transfer via the DMAC 50. The recognition unit 45 sequentially recognizes every character/symbol image block from the character/symbol image blocks stored in the Rx memory 47, and stores the results of recognition in the Tx memory 49 (L1-1–L1-5). When the recognition for one line has been completed, the results are transmitted from the Tx memory 49 to the host machine 34 via the communication control unit 46 and the transmission channel 52 by DMA transfer (Tx1).

The host machine 34 stores the results of recognition in the DMA memory 41 via the communication control unit 40 by DMA transfer, and output the contents on the display unit 36 (Disp1).

When the host machine 34 has completed segmenting of characters/symbols on the second line (L2), the character/symbol image blocks in L2 are transferred to the recognition apparatus 44, as in the transfer operation in L1. The recognition apparatus 44 stores the transferred character/symbol image blocks in L2 in the Rx memory 48. After the completion of the recognition in L1, the recognition apparatus 44 instantaneously starts the recognition of the contents stored in the Rx memory 48 (Rx2, L2-1–L2-3).

In the same manner, recognition continues until the third line is completed, as shown in FIG. 6.

FIG. 7 shows a transmission format to be used in transmission from the host machine 32 to the recognition apparatus 44. The header indicates the size of a 1-character or 1-symbol image block. Symbols $L_{x-1}$–$L_{x-n}$ represent the contents of respective character/symbol image blocks.

FIGS. 8 and 9 show two examples of transmission formats to be used in transmission from the recognition apparatus 44 to the host machine 34. FIG. 8 shows candidate-character information. In FIG. 9, the results of calculation are added to the candidate-character information shown in FIG. 8. Although, in the present embodiment, a case is illustrated wherein the number of candidate characters is four, the number is not limited to four, The header indicates the size of total capacity. Symbols K-1 through K-4 represent candidate-character codes, and symbols S-1 through S-4 represent the results of calculation in the recognition unit 45 which correspond to the respective candidate characters.

Figure 14:
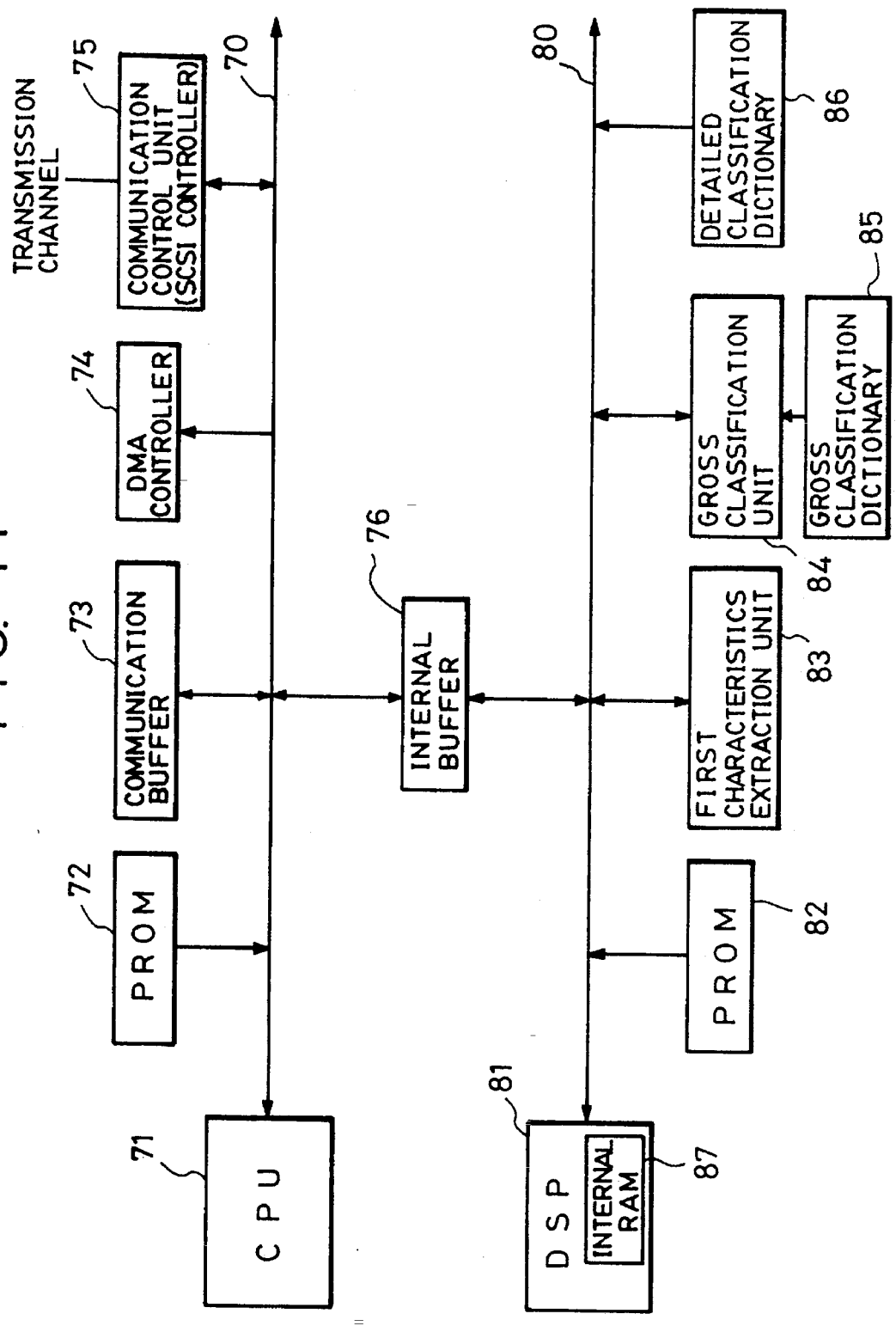
FIG. 14 is a block diagram of the second embodiment to perform character recognition while connected to a computer.

Next, an explanation will be provided of a second embodiment with reference to FIG. 14 wherein recognition speed is increased in a character recognition apparatus by providing a general-purpose CPU, a DSP (digital signal processor) and two dedicated LSIs (large-scale integrated circuits), and performing pipeline processing, the processing being shared by these components.

A recognition board in an OCR apparatus comprises a communication control unit and a recognition unit. The communication control unit controls the transmission/reception of data between a host computer and the recognition unit, and incorporates an SCSI (small computer system interface) controller 75 for communication with the host computer. The communication control unit also includes a communicaton buffer 73, a DMA controller 74 and a PROM (programmable read-only memory) 72.

The recognition unit performs extraction of characteristics, gross classification and detailed classification. Two kinds of dedicated LSIs are mounted on the recognition unit. One is a dedicated LSI for extracting characteristics of a character to be recognized. Another one is a dedicated LSI for roughly selecting candidate characters. The recognition unit also includes a DSP 81, a gross classification dictionary 85, a detailed classification dictionary 86 and a PROM 82. The recognition unit further includes an internal buffer 76 for data transmission to the communication control unit. The internal buffer memory has a dual-port configuration.

CPU 71, the DSP 81 and the two kinds of dedicated LSIs perform different processing from one another. The CPU 71 transfers image data from the communication buffer 73 to the internal buffer 76. The DSP 81 extracts characteristics of a character to be recognized by controlling the characteristics extraction LSI 83, and executes processing to narrowly select candidates from among those presented as a result of the processing by the gross classification LSI 84.

In detailed classification, the distance to a standard pattern is calculated using a pseudo-Bayes identification function for 48 candidates for recognition selected by the gross classification LSI 48, and the 8 most similar characters are selected as final candidate characters. In order to calculate the pseudo-Bayes identification function for one candidate for recognition, 519 product/sum calculations are needed.

In FIG. 1, the OCR apparatus 20 is operated from the side of the host computer 10. If an application tool for that purpose is used, the user can assign an area to be recognized by the OCR apparatus 20 for image data read by an image reader, using the mouse. Furthermore, postprocessing of a recognized document is executed using this tool. For example, a function of performing reversal display of uncertain characters among the result of recognition by the OCR apparatus 20 is provided. For each such uncertain character subjected to reversal display, a character which the user considers suitable can be selected from among other candidate characters for that block.

Figure 10:
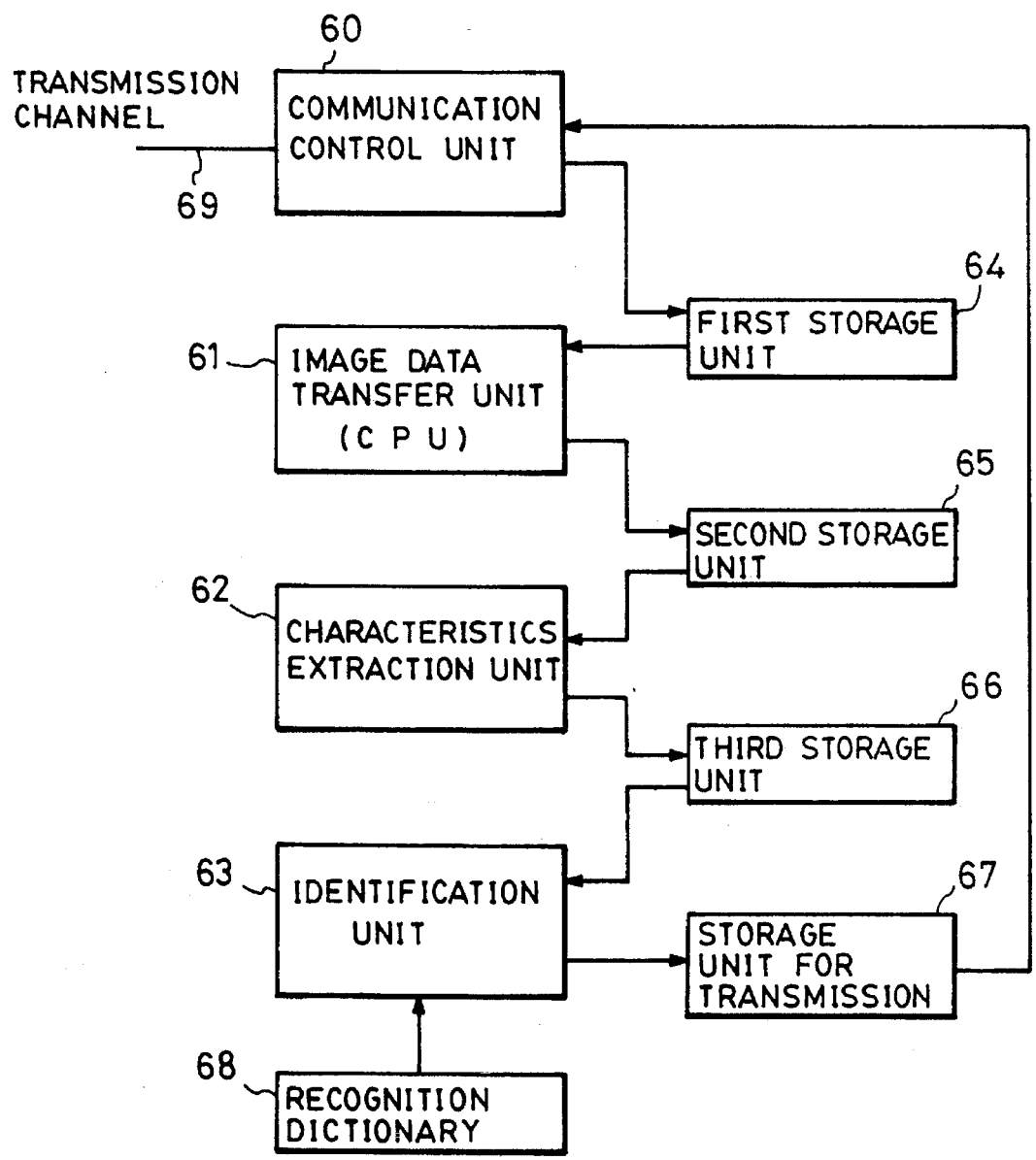
FIG. 10 is a block diagram of a second embodiment of the present invention.
Figure 11:
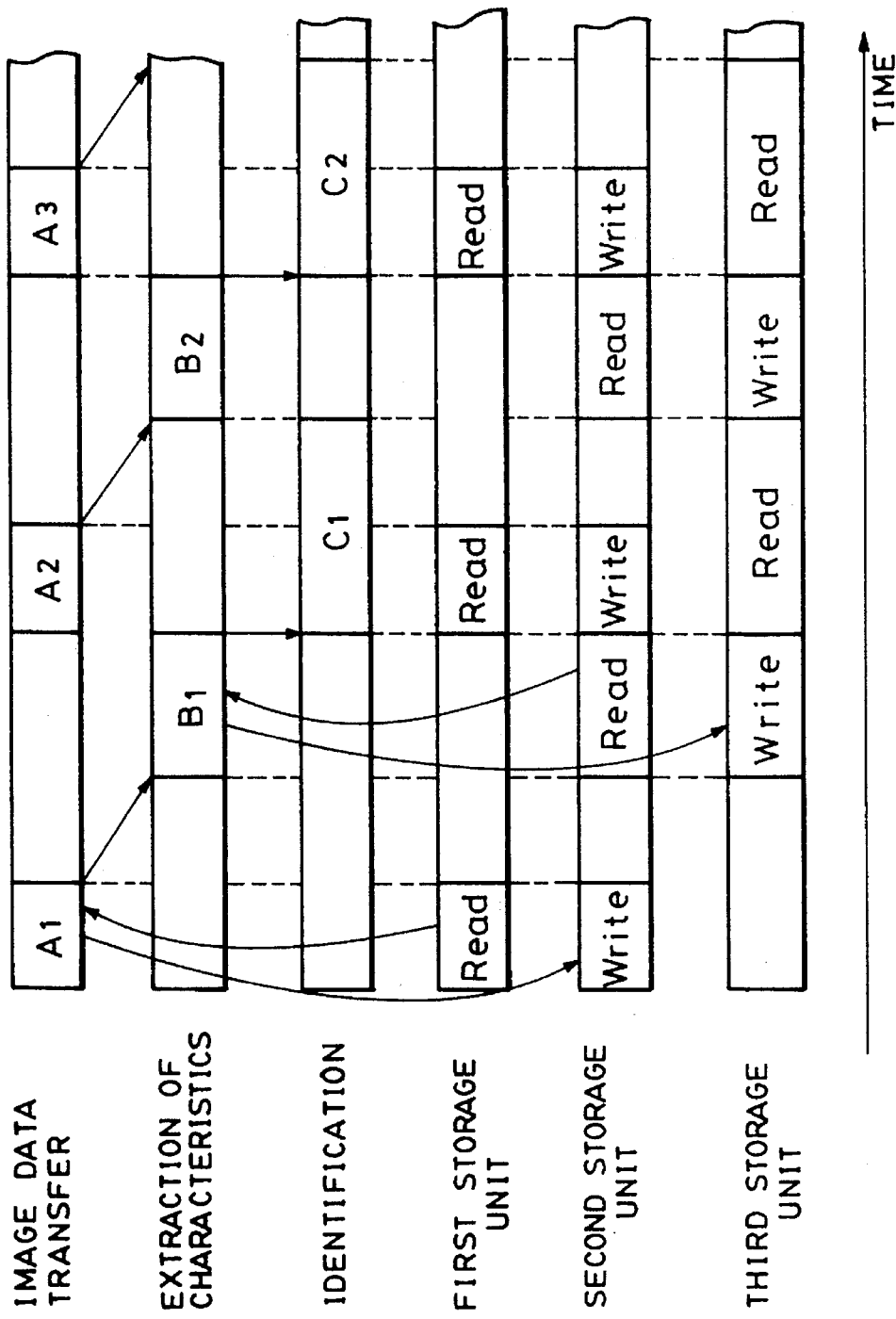
FIG. 11 illustrates the time sequence of operation of the second embodiment.
Figure 12:
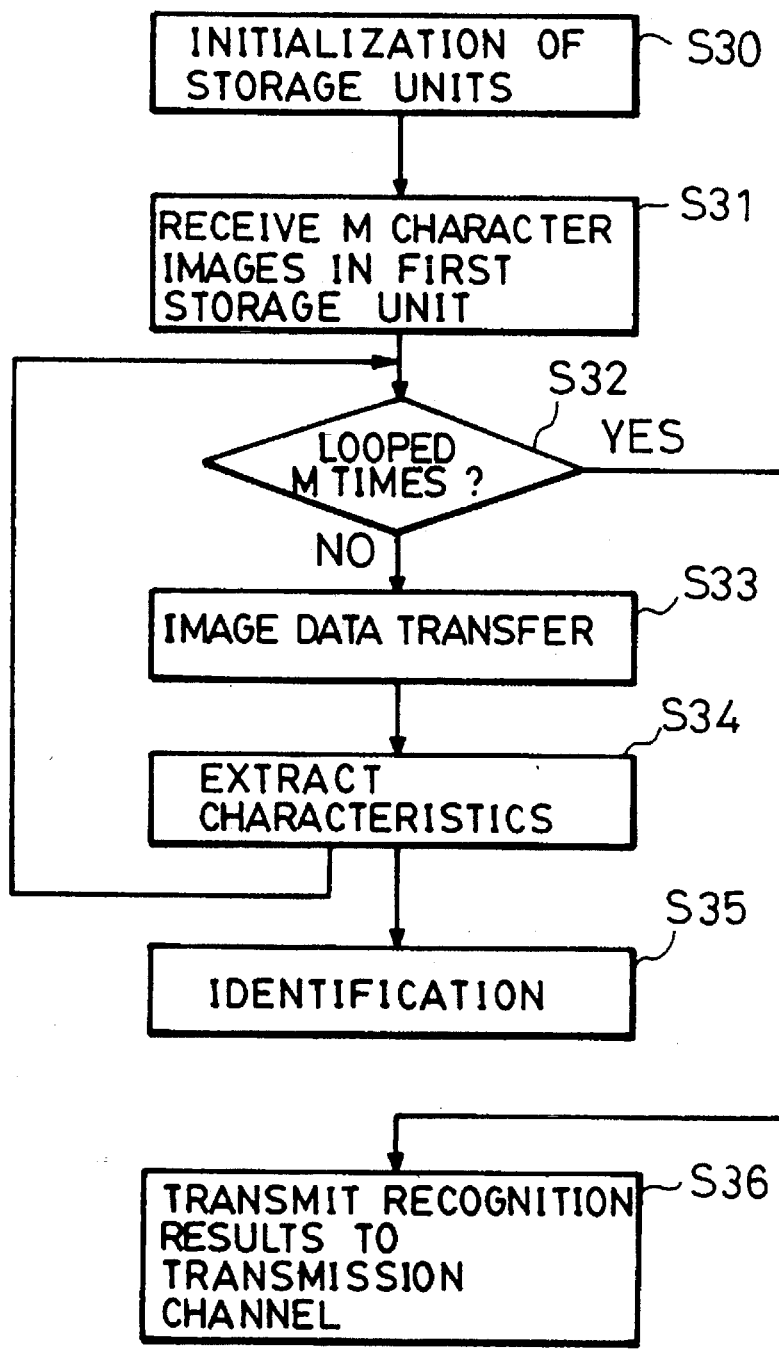
FIG. 12 is a flowchart showing the flow of processing of the second embodiment.

FIGS. 10–13 illustrate the present embodiment. FIG. 1 is most clearly shows the overall structure of the present invention. In FIG. 10, there is shown a transmission channel 69 for connecting the apparatus to the computer. A communication control unit 60 performs communication of data with the outside via the transmission channel 69. A first storage unit 64 stores a plurality of character images received from the transmission channel 69. A second storage unit 65 stores one character image. A CPU 61 sequentially transfers character images one by one from the first storage unit 64 to the second storage unit 65, and controls the entire apparatus. A third storage unit 66 stores characteristics data. A characteristics extraction unit 62 reads the character image stored in the second storage unit 65, extracts characteristics of the read character image, and stores characteristics data in the third storage unit 66. A recognition dictionary 68 stores reference patterns. An identification unit 63 performs character recognition by reading characteristics data stored in the third storage unit 66 and calculating the distance to a standard pattern stored in the recognition dictionary 68, and stores the results of recognition in the storage unit 67 for transmission. FIG. 11 is a time chart illustrating operation of the present embodiment. FIG. 12 is a flowchart of processing of the present embodiment. An explanation will now be provided with reference to FIG. 12.

Figure 13:
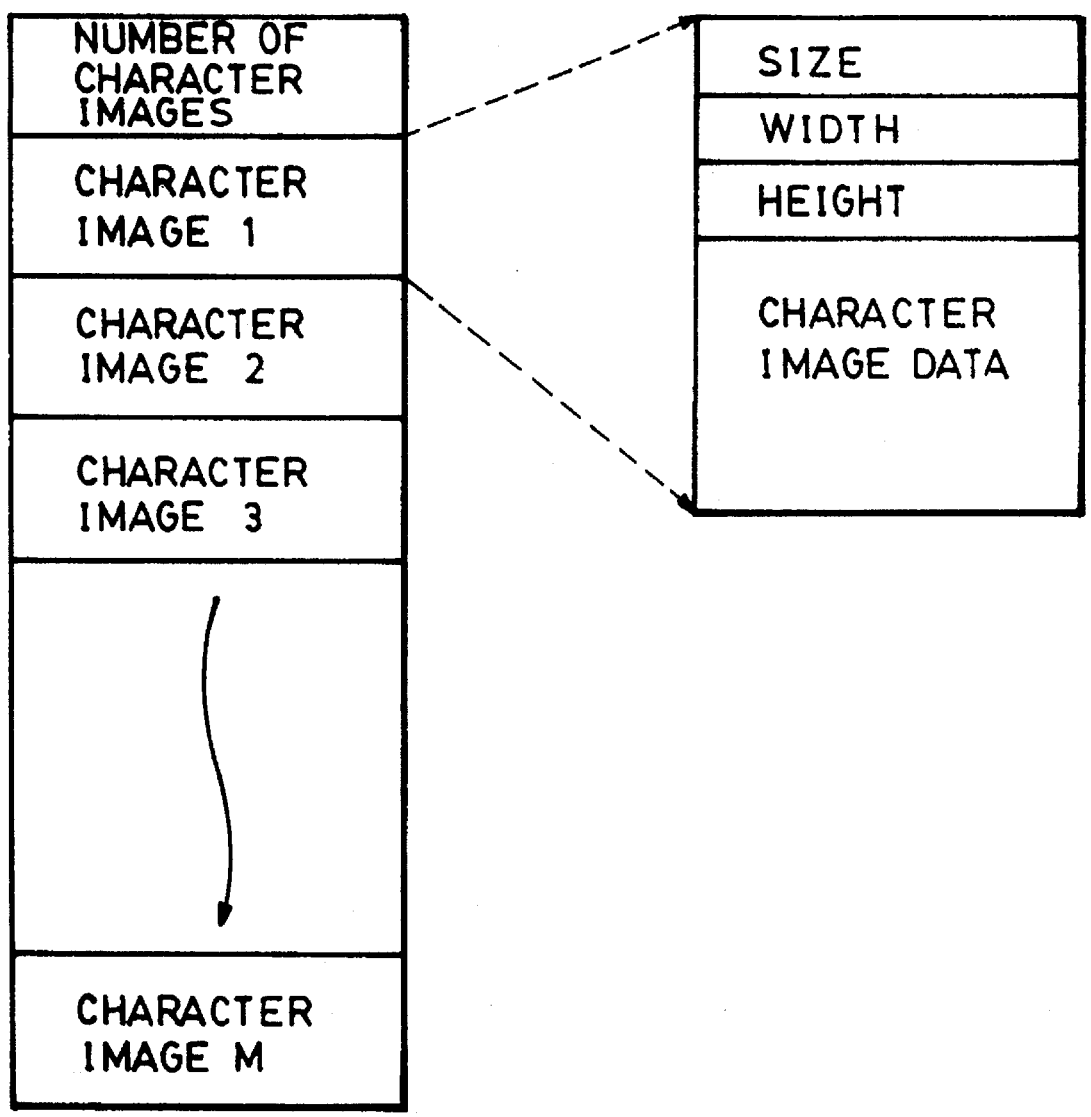
FIG. 13 illustrates character image data formats to be stored in a second storage unit 65.

First, before executing all processing, the contents in the respective storage units 64, 65, 66 and 67 are initialized at step S30. Subsequently, at step S31, a plurality of (M) character images and data as shown in FIG. 13, such as information relating to the size of the character images and the like, are transmitted from a computer (not shown) to the communication control unit 60 via the transmission channel 69, and are stored in the first storage unit 64. Steps S32–S35 are looped for the number of the character images (M times). At step S32, if the number i of the loops already performed is less than M, the process proceeds to step S33, where the CPU 61 accesses the first storage unit 64 to read an i-th character image i, and transfers it to the second storage unit 65. At step S34, the characteristics extraction unit 62 reads data of the chracter image i from the second storage unit 65, performs image processing, and stores characteristics data in the third storage unit 66. Any suitable known technique (for example, a technique shown in Japanese Patent Application Public Disclosure (Kokai) No. 59-177684 (1984)) may be used as the method of extracting characteristics. In the referenced technique, for example, characteristics data are represented by characteristic vectors comprising a weighted directional index histogram. When step S34 has been completed, two kinds of processing are executed in parallel. The first processing is identification processing relating to the character image i at step S35. The second processing is image transfer of character image i+1 at step S33 (if the loop has not been repeated M times at step S32). Timings for such parallel processing are shown in FIG. 11. In the identification processing at step S35, the distance between a standard pattern and the above-described characteristic vector is calculated using a pseudo-Bayes identification expression, as shown in the above-cited Japanese Patent Application Public Disclosure (Kokai) No. 59-177684 (1984), identification is performed while sorting characters in the order of the distance, and the results of recognition (character codes for the 8 most significant characters having small distances, and the calculated values of those distances) are stored in the storage unit 67 for transmission. While executing the identification processing relating to the character image i, the image transfer of the character image i+1 from the first storage unit 64 to the second storage unit 65 is executed in parallel. This operation is possible in the present invention, since the image transfer and the access of the characteristics extraction unit 62 to the second storage unit 65 are not overlapped in time (see FIG. 11).

If the loop from step S32 to step S35 has been repeated M times, the process proceeds to step S36, where the results of character recognition for the M characters (the contents of the storage unit 67 for transmission) are transmitted from the communication control unit 60 to the transmission channel 69.

Next, an explanation will be provided of the character recognition apparatus connected to the computer via the transmission channel with reference to FIGS. 14–17.

Figure 15:
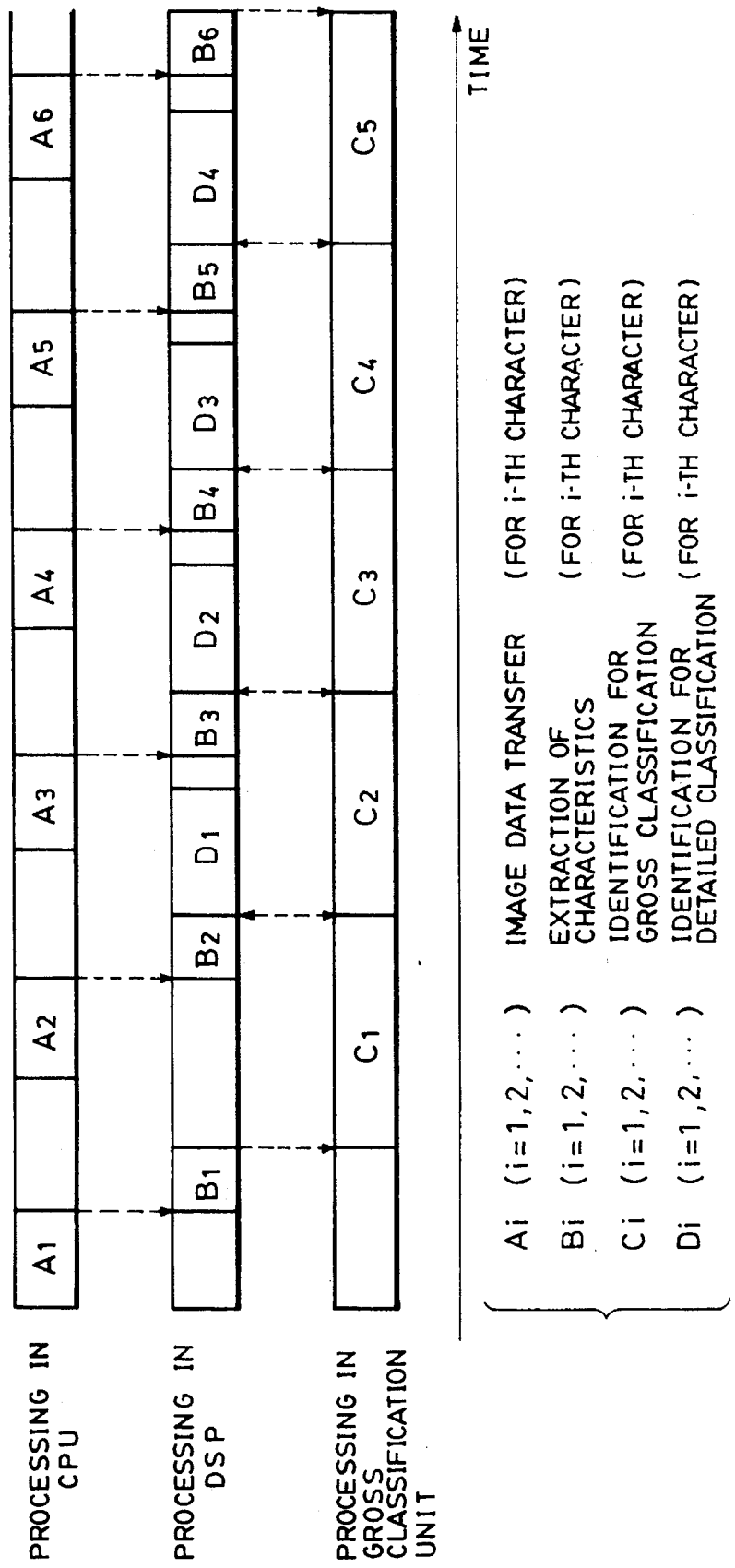
FIG. 15 illustrates the time sequence of character recognition processing performed while being connected to a computer.
Figure 16:
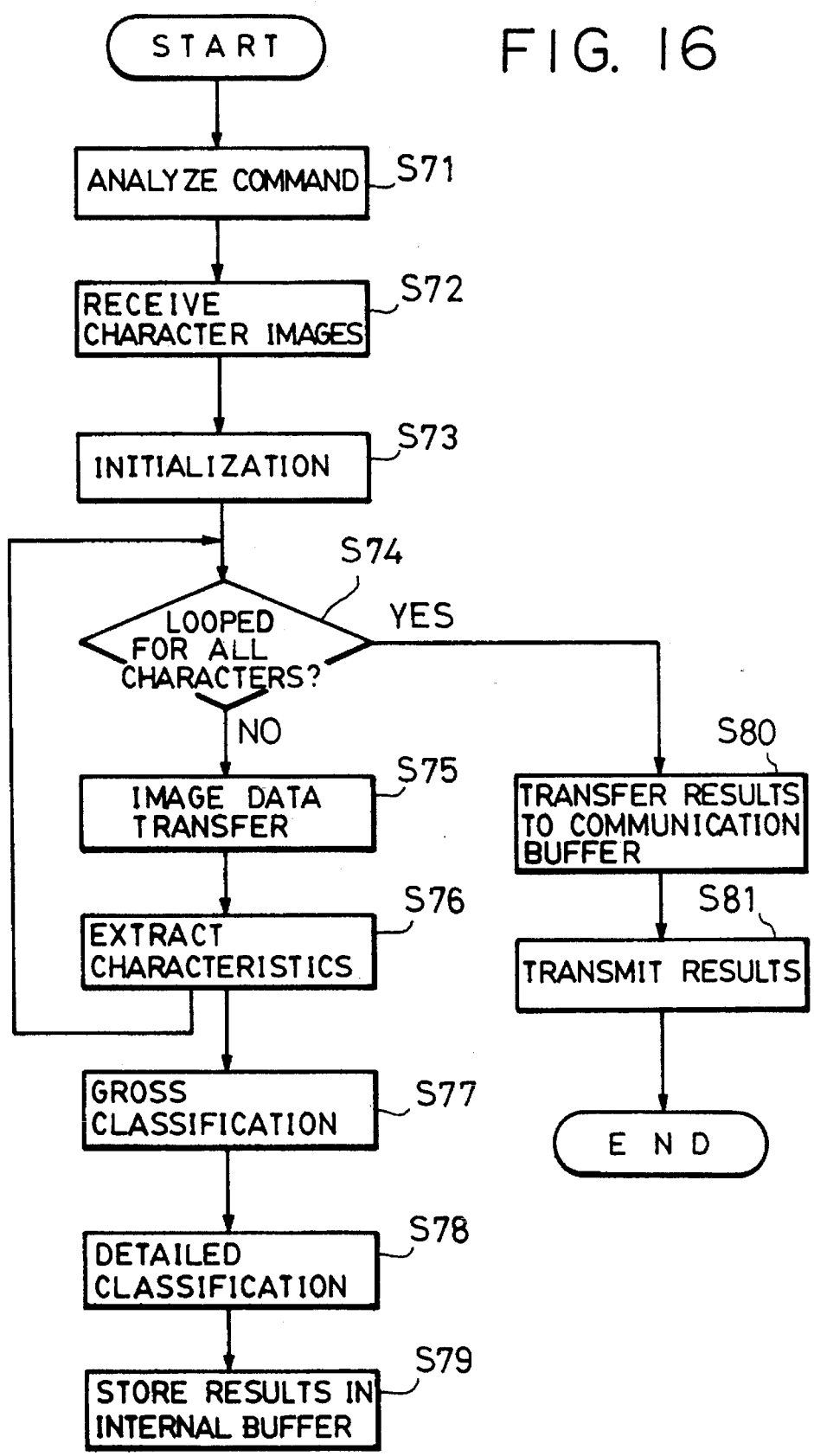
FIG. 16 is a flowchart of character recognition processing performed while the apparatus is connected to a computer.
Figure 18:
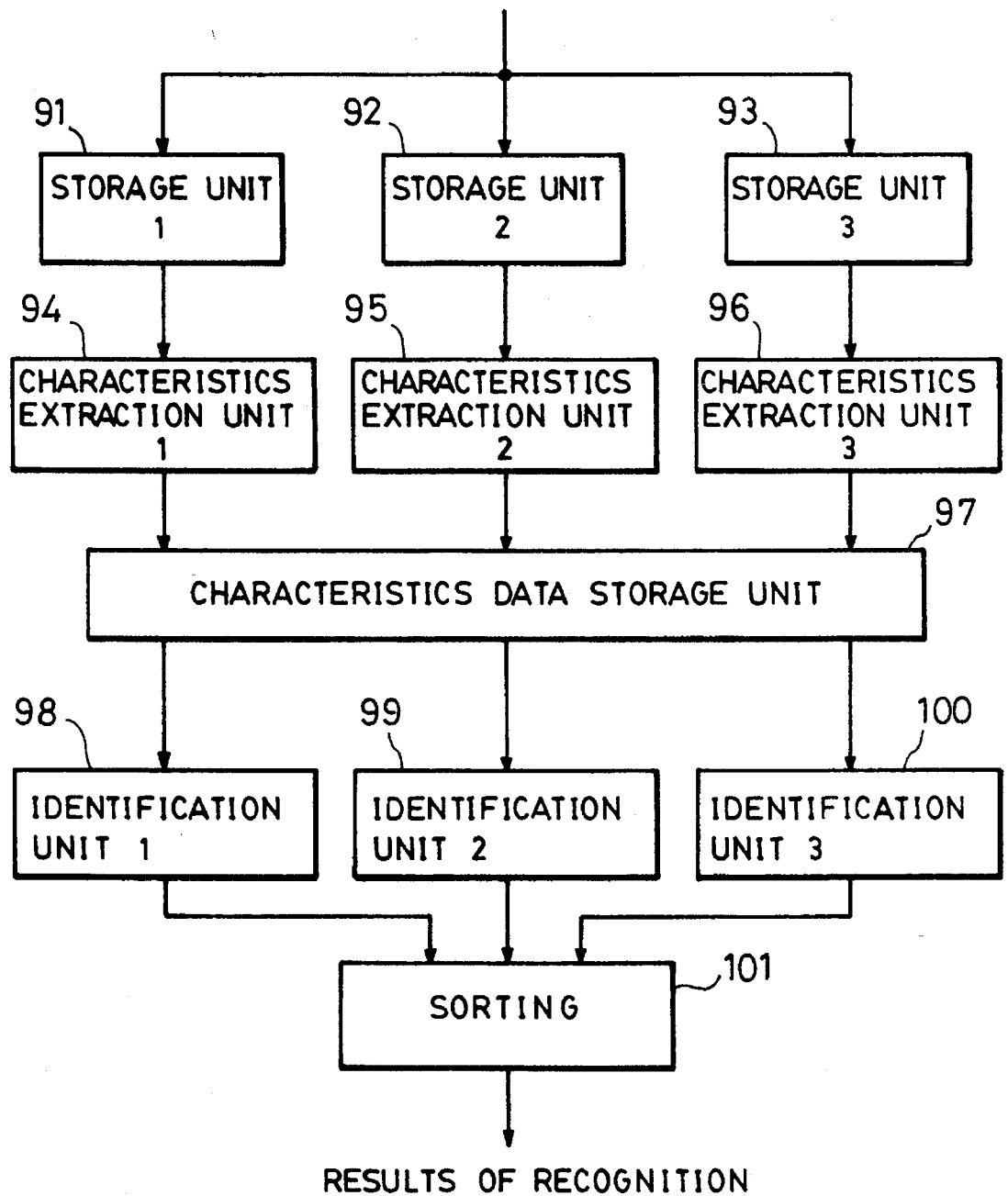
FIG. 18 is a block diagram showing conventional character recognition.

In FIG. 14, the CPU 71 performs image transfer and the control of the entire apparatus. The PROM 72 stores the processing procedure of the CPU 71. The communication buffer 73 stores character images received from the outside via the transmission channel. The DMA controller 74 performs the transmission/reception of data between the transmission channel and the communication buffer 73 without passing through the CPU 71. The communication control unit 75 controls the protocol of the transmission channel. There are also shown data bus 70 for the CPU 71, the internal buffer 76, the DSP 81, data bus 80 for the DSP 81, the PROM 82 for storing the processing procedure of the DSP 81, the first characteristics extraction unit 83, the gross classification unit 84 incorporating an arithmetic unit, the dictionary 85 for gross classification, and the dictionary 86 for detailed classification. FIG. 15 is a timing chart of the present embodiment. FIG. 16 is a flowchart of the embodiment. The operation of the apparatus will now be explained in accordance with the flowchart shown in FIG. 16.

The present apparatus is connected to the computer via the transmission channel. The computer transmits recognition commands or other commands (status requests and the like) to the apparatus. At step S71, a command is analyzed. If the command is a recognition command, the following recognition processing is performed. If the command is a command other than the recognition command, respective processing (which is to be carried out using techniques known to those of ordinary skill, and is therefore not disclosed here in detail) is performed in accordance with the command. At step S72, character image data (M character images) accompanying the recognition command are input to the communication buffer 73 through the communication control unit 75 by the DMA controller 74. The format of the character image data is the same as that shown in FIG. 13. Subsequently, the CPU 71 initializes the memories and the like before recognition (S73). Processing from step S75 to step S79 is then looped a number of tines equal to the number of the character images (M times). Step S74 is a step to determine whether or not the loop has been repeated M times. If the number of repeated loops is less than M at step S74 (the loop is assumed to be the i-th loop), the process proceeds to step S75, where the CPU 71 transfers the i-th character image stored in the communication buffer 73 to the internal buffer 76 (processing Ai in FIG. 15). Subsequently, at step S76, the DSP 81 controls the first characteristics extraction unit 83 to extract characteristics of the i-th character image while accessing the internal buffer 76. In this process, the DSP 81 supposes a predetermined size, for example a 63 pixel×63 pixel character image (a normalized character image.), and maps the i-th character image on this normalized character image. The normalized character image is vertically and horizontally divided into seven sections to provide 49 small areas (each having a size of 9 pixels×9 pixels). The DSP 81 performs raster scanning of respective small areas of the normalized image from the upper left to the lower right, and transmits the values (0 or 1) of the picture elements of the i-th character image corresponding to respective picture elements of the normalized image allocated by the above-described mapping to the characteristics extraction unit 83. The first characteristics extraction unit 83 incorporates a 2-line buffer, and stores the data transmitted from the DSP 81 in the 2-line buffer. If the 2-line buffer is filled up, the 2-line buffer scans the data therein using 2×2 masks, and calculates the numbers of directional indices corresponding to respective patterns shown in FIG. 17. The respective directional indices, as shown in FIG. 17, are transferred to the DSP 81. The directional index for the k-th small area is represented by $f_{kj}$ (j: directional index, j=1, 2, 3 or 4). The DSP 81 sequentially receives the numbers $f_{kj}$ (k=1 to 49, j=1 to 4) of directional indices in all the 49 small areas, and stores them in an internal RAM 87 within the DSP 81. By performing spatial defocusing processing (as shown for example in Japanese Patent Application Public Disclosure (Kokai) No. 59-177684 (1984)), the DSP 81 converts 196-dimensional vectors $f_{kj}$ into 64-dimensional characteristic vectors $F_{mj}$ (m=1 to 16, j=1 to 4), which are stored in the internal RAM 87. This processing at step S76 is indicated by Bi in FIG. 15.

Next, two kinds of processing are performed in parallel. The first processing is the gross classification processing of the i-th character (the next step S77, processing Ci shown in FIG. 15). The second processing is the image transfer of the next (the (i+1)-th) character (processing Ai+1 shown in FIG. 15), i.e., the process returns to step S74.

The dictionary 85 for gross classification contains standard patterns for respective characters. The standard pattern for each character comprises a vector obtained by averaging the characteristic vectors of the character for a predetermined number of various types of the character. The dictionary 85 for gross classification stores such standard patterns for 3310 characters.

At step S77, the distance (the degree of difference) between the obtained characteristic vector and the standard pattern (the average vector $M_{mj}$) is calcuated by means of expression (1) below, and the 48 most significant candidate characters having small distances are obtained (gross classification processing).

$$\text{Distance} = \Sigma_m \Sigma_j (F_{mj} - M_{mj})^2 \quad (1)$$

This gross classification processing is performed independently of the DSP 81, since the distance is calculated using the arithmetic unit incorporated within the gross classification unit 84. Accordingly, during this processing, the extraction of characteristics of the (i+1)-th character image and the detailed classification of the (i−1)-th character image (to be subsequently described) can be executed in parallel.

Next, at step S78, detailed classification is performed. The dictionary 86 for detailed classification stores previously-obtained average vectors, eigenvalues and characteristic vectors for the 3310 characters. The eigenvalue and the characteristic vector are the covariance-matrix eigenvalue and characteristic vector shown in Japanese Patent Application Public Disclosure (Kokai) No. 59-177684 (1984). The distance between the above-described characteristic vector and each of the 48 candidate characters obtained by the gross classification processing is obtained by the pseudo-Bayes identification expression. The candidate characters are sorted in the order of smaller distances, and character codes and the values of the distances of candidate characters having high accuracy are obtained for the 8 most significant (most likely) characters. The results of this recognition (the character codes, and the values of the distances of the candicate characters) are input to the internal RAM 87 within the DSP 81. Such detailed classification is performed by the DSP 81. As can be understood from FIG. 15, the above-described detailed classification processing is performed in parallel with the gross classification processing of the (i+1)-th character image.

Subsequently, at step S79, the DSP 81 transfers the above-described results of recognition stored in the internal RAM 87 to the internal buffer 76.

When the loop from step S75 to step S79 has been repeated M times, the process proceeds to step S80, where the CPU 71 transfers the results of recognition for M character images from the internal buffer 76 to the communication buffer 73. Subsequently, at step S81, the DMA controller 74 transmits the results of recognition to the transmission channel via the communication control unit 75.

What is claimed is:

1. An information recognition apparatus comprising:

first processing means, having a character segmenting unit for segmenting characters from an input image and a display control unit for displaying results of recognition, said first processing means outputting a signal requiring that the segmented characters should be transmitted;

second processing means, having a segmented image storing unit for storing segmented images transmitted from the first processing means and having a recognition unit for recognizing segmented character images, said second processing means outputting a signal requiring that the results of recognition should be transmitted;

transmission control means for transmitting said character images segmented by said character segmenting unit from said first processing means to said second processing means and for transmitting the results of recognition from said second processing means to said first processing means so as to transmit the results recognized by said recognition unit to the display control unit by controlling a sequence of transmission of said images and results with the transmission requirement signals output by said first and second processing means; and control means for controlling said second processing means to begin recognizing segmented character images when segmented character images are stored in the segmented image storing unit regardless of whether the first processing means is segmenting characters, wherein said control means controls the first processing means and the second processing to operate in parallel.

2. An information recognition apparatus according to claim 1, wherein said second processing means further comprises means for storing the character images transmitted from said first processing means.

3. An information recognition apparatus according to claim 1, wherein said second processing means further comprises means for storing the results recognized by said recognition unit.

4. An information recognition apparatus according to claim 1, wherein information to be transmitted by said transmission control means is partial data of said input image, so that transmission is repeatedly performed a plurality of times.

5. An information recognition method comprising:

an apparatus-implemented step of segmenting characters from an input image in a character segmenting unit of the first processor having a display control unit that displays results of recognition, said first processor outputting a signal requiring that the segmented characters should be transmitted;

an apparatus-implemented step of storing segmented character images transmitted from said first processor;

an apparatus-implemented step of recognizing character images in a recognition unit of the second processor, said second processor outputting a signal requiring that the results of recognition should be transmitted;

an apparatus-implemented step of transmitting the character images segmented by the character segmenting unit from the first processor to the second processor;

an apparatus-implemented step of transmitting the results of the recognition from the second processor to the first processor so as to transmit the results recognized by the recognition unit to the display control unit by controlling a sequence of transmission of said images and results with the transmission requirement signals output by said first and second processors; and an apparatus-implemented step of controlling said second processor to begin recognizing segmented character images when segmented character images are stored in the segmented image storage unit, regardless of whether said first processor is segmenting characters, wherein the first processing means and the second processing means are controlled to operate in parallel.

6. An information recognition method according to claim 5, further comprising the step of storing character images transmitted from the first processor in the second processor.

7. An information recognition method according to claim 5, further comprising the step of storing the results recognized by the recognition unit in the second processor.

8. An information recognition apparatus according to claim 5, wherein the information to be transmitted is partial data of the input image, so that transmission is repeatedly performed a plurality of times.

9. A recognition apparatus for use with first processing means for segmenting inputted character images, said recognition apparatus comprising:

second processing means having a segmented image storing unit for storing segmented images transmitted by the first processing means, and having a recognition unit for recognizing segmented character images, said second processing means outputting a signal requiring that the result of recognition should be transmitted;

transmission control means for transmitting the results of recognition from said second processing means to the first processing means by controlling a sequence of transmission of the results of recognition with the transmission requirement signal output by said second processing means;

communication control means for receiving segmented character images from the first processing means and for transmitting recognition results from said second processing means so that the recognition results can be outputted;

control means for controlling said second processing means to begin recognition processing of segmented character images when segmented character images are stored in the segmented image storing unit regardless of whether the first processing means is segmenting characters, whereby said control means controls said second processing means to operate in parallel with the first processing means.

10. A recognition apparatus according to claim 9, which comprises an optical character recognition (OCR) apparatus connectable to a host computer.

11. An information recognition apparatus according to claim 10, wherein said first processing means is comprised by the host computer connected to said OCR apparatus.

12. A recognition apparatus according to claim 9, wherein said transmission control means controls a sequence of transmission of segmented images from the first processing means and transmission of recognition results from the second processing means with the transmission requirement signal output by said second processing means and a transmission requirement signal output by the first processing means requiring that segmented images should be transmitted.

13. An information recognition apparatus according to claim 1, wherein inputting of the input image is performed by a scanner.

14. An information recognition apparatus according to claim 1, wherein inputting of the input image is performed by a facsimile.

15. An information recognition apparatus according to claim 1, wherein inputting of the input image is performed by an image file.

16. A recognition apparatus according to claim 9, wherein inputting of the inputted character images is performed by a scanner.

17. A recognition apparatus according to claim 9, wherein inputting of the inputted character images is performed by a facsimile.

18. A recognition apparatus according to claim 9, wherein inputting of the inputted character images is performed by an image file.

* * * * *